US006964275B2

(12) United States Patent
Carl et al.

(10) Patent No.: US 6,964,275 B2
(45) Date of Patent: Nov. 15, 2005

(54) COUNTERMEASURE WASHDOWN SYSTEM CLEANING

(75) Inventors: S. Steven Carl, Glendale, AZ (US); Franklin D. Dean, Jr., Poquoson, VA (US); Donald F. Tallman, Gates, NC (US)

(73) Assignee: H.E.R.C. Products Incorporated, Portsmouth, VA (US)

( * ) Notice: Subject to any disclaimer, the term of this patent is extended or adjusted under 35 U.S.C. 154(b) by 87 days.

(21) Appl. No.: 10/025,629

(22) Filed: Dec. 26, 2001

(65) Prior Publication Data

US 2005/0194025 A1 Sep. 8, 2005

(51) Int. Cl.[7] .............................. B08B 9/02; C23G 1/02
(52) U.S. Cl. ................................ 134/22.11; 134/22.14; 134/3; 134/41
(58) Field of Search .............................. 139/22.1, 22.4, 139/22.12, 22.13, 22.14, 3, 4, 922.11, 41

(56) References Cited

U.S. PATENT DOCUMENTS

| | | | |
|---|---|---|---|
| 2,758,970 A | 8/1956 | Saukaitis, et al. | 252/8.55 |
| 2,807,585 A | 9/1957 | Gardner, et al. | 252/148 |
| 2,941,946 A | 6/1960 | Saukaitis | 252/151 |
| 2,953,143 A | 9/1960 | Kearns | 134/58 |
| 3,077,454 A | 2/1963 | Monroe, et al. | 252/148 |
| 3,607,781 A | 9/1971 | Kaneko, et al. | 252/389 |
| 3,668,137 A | 6/1972 | Gardner | 252/149 |
| 3,885,913 A | 5/1975 | Redmore, et al. | 21/2.7 |
| 3,969,255 A * | 7/1976 | Connelly, Jr. | 510/253 |
| 4,089,795 A | 5/1978 | Bailey et al. | 252/135 |
| 4,199,469 A | 4/1980 | Walzer | 252/146 |
| 4,209,418 A * | 6/1980 | Anderson | 510/253 |
| 4,310,435 A | 1/1982 | Frenier | 252/180 |
| 4,328,638 A | 5/1982 | Smithson | 43/124 |
| 4,451,296 A * | 5/1984 | Barabas | 134/4 |
| 4,462,914 A | 7/1984 | Smith | 210/755 |
| 4,541,945 A | 9/1985 | Anderson et al. | 252/149 |
| 4,554,090 A | 11/1985 | Jones | 252/181 |
| 4,561,983 A | 12/1985 | Davis et al. | 210/755 |
| 4,579,665 A | 4/1986 | Davis et al. | 210/755 |
| 4,587,030 A | 5/1986 | Casey | 252/92 |
| 4,614,600 A | 9/1986 | Schilling et al. | 252/8.553 |
| 4,637,899 A | 1/1987 | Kennedy, Jr. | 252/542 |
| 4,670,186 A | 6/1987 | Quinlan | 252/392 |
| 4,780,150 A | 10/1988 | Anderson et al. | 134/3 |
| 4,816,163 A | 3/1989 | Lyons et al. | 210/698 |
| 4,851,149 A | 7/1989 | Carandang | 252/147 |
| 4,857,209 A | 8/1989 | Lyons et al. | 210/755 |
| 5,192,451 A | 3/1993 | Gill | 210/755 |
| 5,360,488 A | 11/1994 | Hieatt et al. | 134/22.11 |
| 5,527,395 A | 6/1996 | Perry et al. | 134/3 |

(Continued)

FOREIGN PATENT DOCUMENTS

WO     WO 00 00306     6/2000     ............ B08B 9/02

*Primary Examiner*—Michael Barr
*Assistant Examiner*—Saeed T. Chaudhry
(74) *Attorney, Agent, or Firm*—Wood, Herron & Evans, L.L.P.

(57) ABSTRACT

Methods and compositions for cleaning and maintaining chemical, biological and radiological countermeasure washdown systems are disclosed. Systems are effectively cleaned by the removal of water scale, including deposits, sediment, microbiological scale, microinvertebrate fouling, and the like, from the inside surfaces of piping in the system. A section of the system is isolated for cleaning and an aqueous acidic cleaning solution is circulated through the fouled pipe section to be cleaned for a sufficient time and at a controlled pH to dissolve and loosen the scale. After cleaning all of the sections, the system is restored to operational readiness.

12 Claims, 2 Drawing Sheets

U.S. PATENT DOCUMENTS

| | | | |
|---|---|---|---|
| 5,680,877 A | 10/1997 | Edstrand et al. | 134/103.1 |
| 5,800,629 A | 9/1998 | Ludwig et al. | 134/22.11 |
| 5,873,944 A | 2/1999 | Lien et al. | 134/10 |
| 5,885,364 A | 3/1999 | Hieatt et al. | 134/22.11 |
| 5,895,763 A | 4/1999 | Edstrand et al. | 436/55 |
| 5,900,157 A | 5/1999 | Petrille et al. | 210/755 |
| 6,076,536 A | 6/2000 | Ludwig et al. | 134/22.11 |
| 6,183,646 B1 | 2/2001 | Williams et al. | 210/636 |

\* cited by examiner

COUNTERMEASURE WASHDOWN SYSTEM CLEANING

FIELD OF THE INVENTION

This invention relates to methods, compositions and equipment for removing blockages of scale, deposits, sediment and the like from chemical, biological and radiological countermeasure washdown piping distribution systems on board ships.

BACKGROUND OF THE INVENTION

With the evolution of chemical, microbiological and nuclear weapons has come the development of various countermeasures to offset the deployment of such weapons of mass destruction and their aftereffects. One such development has been the countermeasure washdown systems employed on ships of the U.S. Navy and Coast Guard. These systems are activated when the ships have been exposed to chemical, microbiological or nuclear fallout from the deployment of such weapons. When activated these systems flood the entire surface of the ship with water spray which washes the fallout contamination from the ship surfaces which results in minimal exposure of the crew to the deadly effects of the weapons. These systems utilize the water from the body of water where the ship is located. It is usually fed off of the ships fire water system main with pumps supplying the various sections of the system with the necessary piping and spray heads to deliver water to the entire surface of the ship.

It is necessary that these countermeasure washdown systems be maintained in a state of readiness at all times. Prior to entering or leaving port the systems are usually made operational to determine their readiness. In many cases the system may have sections that have reduced flow rates because of blockages and it is required that they be cleaned and returned to designed operational readiness. Blockages in fresh and seawater piping systems result from corrosion and biofouling of the pipes which can occur from the residual water and its contaminants left in the system after activation. These contaminants can vary widely depending on the travels of the ship. Shallow depths and warm water are likely to be more problematic for service water systems. Macroinvertebrate to plant and animal microscopic life stages are some of the main causes of blockage. Mussels, oysters and clams are predominate species that cause biofouling. Their threadlike tentacles enable them to attach themselves to the pipe wall and to "stack up" upon themselves to cause the blockages. Other microscopic life stages such as larvae, mollusks, barnacles, sponges, tunicates, hydroids, annelids, snails, sea anemones and the like can cause settlement or attachment in the system piping resulting in blockages. Seaweed, green ribbon grass, phytoplankton, and the like can also cause undesirable blockages of the system.

Microbiologically influenced corrosion can also be present particularly when seawater, which is high in sulfate ion, is left in the system. Microbiological films and slime resulting from sulfate reducing bacteria, acid producing bacteria (which also cause corrosion of the pipe), also contribute to the operational problems of the systems. Also, blockages can result from the silt and salt deposits from the residual water employed in the testing or deployment of the countermeasure washdown system.

The above described variety of blockages present a difficult cleaning task. In addition, aluminum piping and other aluminum fabrication is used above deck on ships to decrease the weight of the vessel and to increase the stability of the ship by lowering its center of gravity. The aluminum piping systems and the degree of bends and turns in the system all add to the challenge of cleaning to maintain the operational readiness of the system for deployment. It is imperative that the chemical, biological and radiological washdown system be at 100% operational design. Therefore, the washdown system must be maintained with no blockages to reduce the design flows of the system. In the past, high pressure air or water jets have been used to pressure blast the blockage from the piping systems. This is a difficult task because of all the bends, turns, vertical and horizontal positioning of the piping configuration of the various sections of the countermeasure washdown system.

Mechanical cleaning with "snakes" or augers is also difficult and can only be used on straight runs of pipe for removing only the loose debris in the center of the pipe. High pressure air, water jet and mechanical cleaning require almost complete dismantling of the system to create access for cleaning. Such dismantling requires extended periods of unacceptable downtime for the system and the ship.

Traditional means of chemical cleaning of scale from conventional (mostly iron) pipe systems by circulating acidic cleaning solutions through sections of the system to restore flow has been described in patents. U.S. Pat. Nos. 5,360,488 and 5,885,364 (Hieatt, et al.) describe a method for cleaning sections of potable water systems with acidic cleaning solutions. U.S. Pat. No. 5,527,395 (Ludwig, et al.) describes a chemical cleaning process improvement of U.S. Pat. No. 5,360,488. U.S. Pat. No. 5,680,877 (Edstrand, et.al) describes a system (equipment) for cleaning pipe sections of a water distribution network. U.S. Pat. No. 5,873,944 (Lien, et al.) describes a method of and a system for removing blockage from pipes in vacuum waste systems. U.S. Pat. No. 5,800,629 (Fyfe, et al.) describes a process for pipe system cleaning and in-line treatment of spent pipe system cleaning solution prior to disposal. U.S. Pat. No. 5,895,763 (Temple, et al.) describes a method for the controlled removal of carbonate scale from water conduit systems. U.S. Pat. No. 6,076,536 describes a method to chemically clean and immediately passivate a water distribution system. All of the above patents are assigned to the assignee of the present invention and are hereby incorporated by reference in their entirety. None of the above patents addresses the cleaning of countermeasure washdown systems, the scale associated with the countermeasure washdown systems or the cleaning of aluminum pipe associated with countermeasure washdown systems.

Additional patents describe physical/mechanical and chemical techniques to prevent the formation of various scales from forming in water pipe systems by treating the feed water. U.S. Pat. Nos. 4,328,638; 4,462,914; 4,561,983; 4,579,665; 4,816,163; 4,857,209; 5,192,451; 5,900,157 and 6,183,646 are examples. However, such physical/mechanical and chemical techniques are impractical for countermeasure washdown systems and none have been employed in combination with countermeasure washdown systems.

In view of the above background, new methods, cleaning compositions and equipment are needed to remove blockage from chemical, biological and radiological countermeasure washdown systems on ships which contain aluminum pipe. Furthermore, needed improvements in current cleaning practices have been given a high priority so that fleet readiness may be maintained.

SUMMARY OF THE INVENTION

This invention is directed to a method for chemically cleaning a countermeasure washdown system on board ships. The method involves isolating a section of piping in the countermeasure washdown system for the delivery of a cleaning solution, wherein the system of piping includes a plurality of washdown spray nozzles and aluminum piping. An acid cleaning solution which does not deleteriously affect aluminum is introduced into the section and is maintained for the removal of scale and sediment. Thereafter, the cleaning solution which contains the scale and sediment is removed to provide the cleaned interior section which is then restored to the system.

In accordance with the preferred method, the pH of the acidic cleaning solution is maintained on the order of about 2.0 to about 2.2. Furthermore, the pH is monitored during cleaning to achieve the pH level to indicate an effectively cleaned pipe section. Also, the cleaning solution is preferably circulated through the isolated pipe section in a closed loop and the spent cleaning solution is removed from the loop before restoration of the isolated pipe in the system. Thus, the system may be maintained operational except for the section which is being cleaned.

In a preferred embodiment, the isolated section is configured into a closed loop by using connectors between (a) an end of the section and a manifold, (b) the manifold and a pump and (c) the pump and a source of cleaning solution.

In other aspects of the method, a mobile unit may be employed to clean the system and hoses are connected from the mobile unit for introduction of the cleaning solution into the isolated pipe section. Spent cleaning solution may be rendered environmentally safe before removal from the isolated system by adding appropriate treating agents. In other features of the invention, spray nozzles of the system are inactivated by removing and replacing them with temporary fittings. Temporary fittings such as a valve, plug, pipe, or combinations thereof, are used when the complete system is being cleaned.

Other features and advantages of the invention will be further understood with reference to the detailed description which follows hereinafter.

DETAILED DESCRIPTION OF THE INVENTION

This invention is directed to methods and compositions for cleaning countermeasure washdown systems on board ships. According to this invention, a section of the countermeasure washdown system is isolated. The sprinkler heads in the isolated section are removed and replaced with fittings. A circulation hose is attached to the section fitting in order to circulate the cleaning solution. The hoses from the sprinkler head pipe fittings are then attached to a manifold which then attaches to a circulation unit which may be located dockside to the ship. A mobile circulation unit may be used.

The cleaning solution is then circulated through the isolated section of the countermeasure washdown system through a fitting located just above the fire main piping and then to the manifold back to the circulation unit. An acidic cleaning solution is employed having a pH of about 2.0 to 2.2. The solution is kept at the pH level of about 2.0 to 2.2 during the cleaning process until the system is cleaned of blockage. The cleaning solution is usually then neutralized prior to disposal and the clean countermeasure system flushed with fresh water. Boroscope examination of the pipe may be employed to confirm the cleaning process has removed all blockage from the system.

Aqueous solutions of organic mono-, di- and polycarboxylic acids have been found to be useful and include formic, acetic, propionic, citric, glycolic, lactic, tartaric, polyacrylic, succinic, sulfonic, and the like. Mineral acids such as hydrochloric, nitric, phosphoric, polyphosphoric, hydrofluoric, boric, sulfuric, sulfurous, and the like may also be employed as dilute solutions having a pH of about 2.0 to 2.2.

The acidic cleaning solution may also contain acid inhibitors which can substantially reduce the acidic action on the aluminum pipe. Various inhibitors for acids have been well documented in the patent art. Typical, but not necessarily all inclusive, examples of acid inhibitors are disclosed in the following U.S. Pat. Nos.: 2,758,970; 2,807,585; 2,941,949; 3,077,454; 3,607,781; 3,668,137; 3,885,913; 4,089,795; 4,199,469; 4,310,435; 4,541,945; 4,554,090; 4,587,030; 4,614,600; 4,637,899; 4,670,186; 4,780,150 and 4,851,149 which are incorporated herein by reference.

The treatment solution may also contain dispersing, penetrating or emulsifying agents to assist in the removal of the scale and sediment. These surface active agents may be anionic, cationic, nonionic or amphoteric as defined in the art. Compounds such as alkyl ether sulfates, alkyl or aryl sulfates, alkanolamines, ethoxylated alkanolamides, amine oxides, ammonium and alkali soaps, betaines, hydrotropes such as sodium aryl sulfonates, ethoxylated and propoxylated fatty alcohols, sugars, ethoxylated and propoxylated alkylphenols, sulfonates, phosphate esters, quaternaries, sulfosuccinates, and mixtures thereof, have been found to be useful in admixture with the acid treating solution.

The following FIGS. 1–4 and detailed description illustrate the practice of the invention.

DETAILED DESCRIPTION OF THE PREFERRED EMBODIMENT

With the advent of chemical, biological and nuclear weapons of destruction and the threat of their use, ships of the U.S. Navy and Coast Guard have been retrofitted with countermeasure washdown systems consisting of interior piping of multi-metallurgic compositions, including aluminum pipe, and a series of spray nozzles which spray water on exposed decks and other surfaces. The resulting flow of water prevents and removes the accumulation of the various possible contaminants which could otherwise be carried to the inside of the vessel or lodged in the crevices of the structure. New ships are fitted with countermeasure washdown systems during construction.

Figure 1:
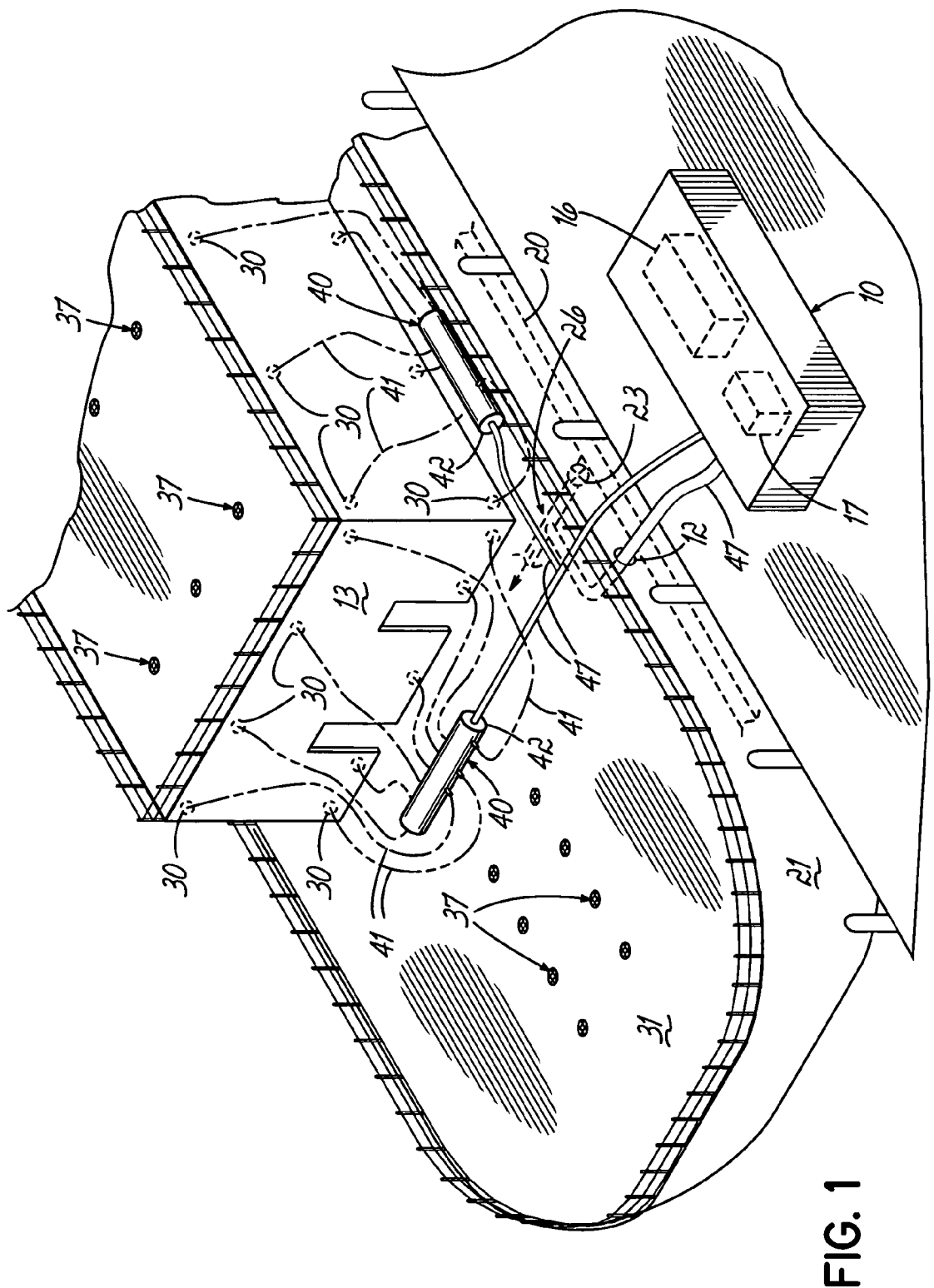
FIG. 1 illustrates a ship dockside and a mobile recirculation unit for cleaning a countermeasure washdown system.

FIG. 1 demonstrates the typical connections for cleaning a countermeasure washdown system having the conventional sprayer fittings. The countermeasure washdown systems are complex in their piping, particularly in the older retrofit systems. However, FIG. 1 is a simplified set-up required for cleaning a section of the system having conventional spray heads 30 to spray on the vertical surfaces 13 and the horizontal deck 31. Other funnel spray heads 37 are used for the flat decks 31 of ships as described in FIG. 3. A mobile recirculation unit 10 is parked dockside having a tank 16 and pump 17 for circulating the cleaning solution in both directions. A large hose 11 is connected through a porthole 12 (in this case) to the tee 26 which is connected to the fire water main 20 as described in FIG. 2.

Figure 2:
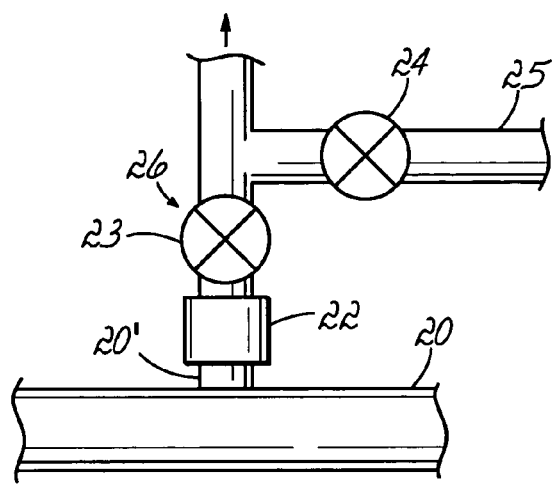
FIG. 2 shows a pipe section tap into the fire water main of the ship for cleaning a pipe section of the countermeasure washdown system.

With reference to FIG. 2, the countermeasure washdown sections are usually supplied by water from the water main 20 of the fire protection system which normally draws water from the bottom of the hull 21 and continuously circulates it through the water main 20 around the bottom of the hull 21. FIG. 2 shows a typical countermeasure washdown pipe section tap 20' into the fire water main 20. The tap 20' usually contains a pump 22 and/or valve 23 which are activated to wash down the ship in case of attack and contamination. In order to clean the countermeasure washdown section fed off of the fire main tap, a tee 26 is normally installed with a valve 24 and a fitting 25 to attach a hose 11 from the valve 24 to the cleaning solution circulation pump and tank of the mobile recirculation unit 10 in order to isolate the fire main 20 during the cleaning of the countermeasure washdown section. The tee 26 then becomes a permanent part of the system for future cleaning.

Figure 3:
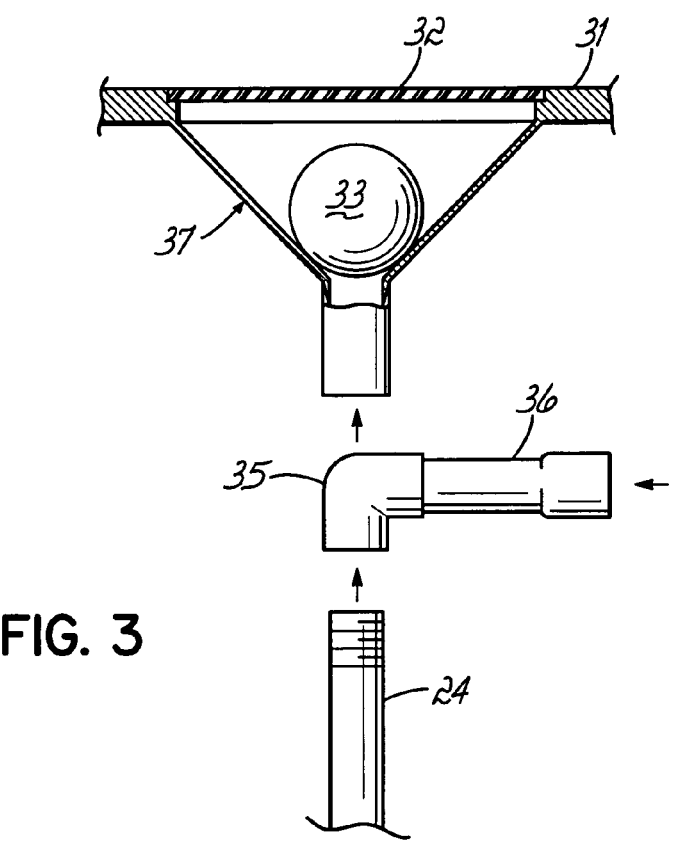
FIG. 3 illustrates the funnel spray heads employed on the flat aircraft carrier landing decks and helicopter landing areas

Spray heads 30 of the countermeasure washdown system are removed and replaced with a hose fitting to which the hoses are attached for utilization during the cleaning procedure. For horizontal ship surfaces such as aircraft carrier landing decks and helicopter landing areas, permanently installed spray heads 37 on the deck 31 are employed as shown in FIG. 1. As shown in FIG. 3, the spray head 37 is funnel-shaped and is welded solidly into the deck 31. A grid 32 covers the spray head 37 and is also welded to the deck 31 thus allowing full utilization of the deck. A steel ball 33 prevents dirt and debris from the deck from getting into the washdown feed line pipe 34. Upon activation of the countermeasure washdown system the steel ball rises thus allowing water to flow past it and flood the deck to remove the contamination.

In order to clean the countermeasure washdown system for the aircraft landing areas, the feed pipe 34 must be disconnected from the funnel spray head 37 and an elbow 35 and a hose fitting 36 installed onto the feed pipe 34, as shown in FIG. 3. A hose is then attached to the fitting 36 during chemical cleaning of the system. Upon completion of the cleaning, the elbow 35 and hose fitting 36 are disconnected and the feed pipe 34 reconnected to the funnel spray head 37.

The non-aircraft landing areas of the ship are sprayed by conventional open head sprayers 30 which are removed for the cleaning process. The hoses for circulating the cleaning solution are then attached to the same fitting to which the conventional head sprayers had been attached. In FIG. 1, the hoses 41 connect from fittings of the disconnected spray head 30 to the manifolds 40.

Figure 4:
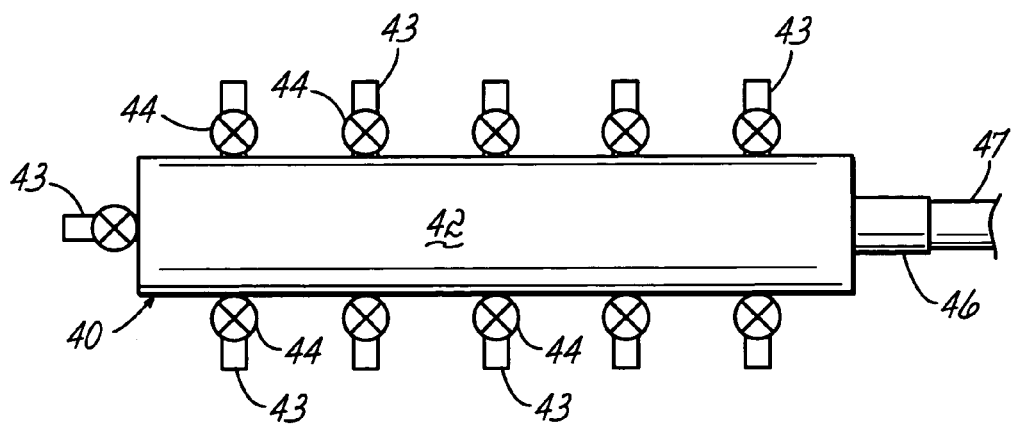
FIG. 4 shows a hose manifold employed in the cleaning process.

FIG. 4 shows the hose manifold 40 shown generally in FIG. 1 which is employed in the chemical cleaning process. The multitude of the number of spray heads 30 in a section of the system requires a multitude of hoses 41 (shown in phantom lines) to be employed to transfer the cleaning solution through the entire section to be cleaned. The hoses 41 are normally fed to such a manifold 40 as shown in FIG. 1. The manifold 40 consists of a large pipe 42 which has been closed on the ends and fitted with a number of valves 44 and hose fittings 43 for connecting to the hoses 41 from the spray heads 30. The larger fitting 46 at one end of the pipe is used to attach a larger hose 47 to accommodate the volume of flow from and to the smaller hoses 41 connected to the fittings of removed spray heads 30 and the manifold 40 to and from the cleaning solution pump and tank of mobile unit 10.

Thus, in this preferred embodiment, the isolated section is configured into a closed loop by using connectors between (a) an end of the section and a manifold, (b) the manifold and a pump and (c) the pump and a source of cleaning solution.

In operation, the system allows the cleaning solution to flow into and out of the countermeasure washdown section being cleaned. The smaller hoses 41 are connected from the fittings of the removed spray heads 30 to the manifolds 40 as described in FIG. 3. The manifolds 40 are then connected to the mobile unit 10 through larger hoses 47 which may run over the rail on the main deck to the mobile unit 10 on the dock.

The required amount of the acidic cleaning solution is charged to the tank 16 on the mobile unit 10, the valve 23 from the fire main 20 to the countermeasure washdown section is in the closed position and the valve 24 from the mobile unit 10 to the isolated section to be cleaned is opened (as shown in FIG. 2). The pump 17 on the mobile unit 10 is turned on and the cleaning circulation process begun. The cleaning solution pH is monitored and maintained at a pH of about 2 to about 2.2 to insure a desired clean rate without attacking the aluminum piping of the system. Pipe-Klean C which is a solution of citric acid in water, an NSF grade cleaning composition supplied by H. E. R. C. Products Incorporated, Phoenix, Ariz., has been found to be an excellent acidic cleaner at a pH of about 2 to about 2.2 for countermeasure washdown systems. The addition of additional dispersants, i.e., Pipe-Klean Concentrate (an aqueous solution of glycolic acid, triethanol amine and dispersant), supplied by H. E. R. C. Products Incorporated, and acid inhibitors, i.e., Rodine 2002, supplied by Henkel, Cincinnati, Ohio, has also been found to be desirable.

The cleaning process is followed by maintaining the desired pH of about 2 to about 2.2 by the addition of acid. It can also be followed by improved flow rates through the system at a given mobile unit pump pressure. If certain areas of the system are badly plugged, the valves on the manifold can be adjusted to provide a higher flow rate to those sections to improve the clean rate. The mobile unit 10 is also used to reverse the flow of the cleaning solution which can also assist in the cleaning process.

Upon completion of the cleaning as determined by a constant pH and maximized flow rate at a constant pump pressure, the cleaning solution can be neutralized with base to an acceptable pH for disposal while in line or it can be flushed into the mobile unit tank by available water and then neutralized for disposal. The cleaned section is then flushed with available water until the effluent has the same pH as the incoming water.

The hoses 41 are then disconnected and the spray heads 30 are reconnected. The manifolds 40 are also disconnected from the spray head hoses 41 and the mobile unit hose connections. The valve 24 connecting the mobile unit 10 to the countermeasure washdown system piping is closed and the system is ready for service. If desired, boroscope examination of the interior of the cleaned pipes can be used to confirm the removal of the blockages.

In view of the above detailed description, other method variations to clean countermeasure washdown systems will be apparent to a person of ordinary skill in the art without departing from the scope of this invention.

What is claimed is:

1. A method for chemically cleaning a countermeasure washdown system containing marine scale on board ships comprising
    isolating a section of piping in the countermeasure washdown system for the delivery of a cleaning solution, wherein said section includes a plurality of washdown spray nozzles and aluminum piping,
    inactivating said spray nozzles by removing and replacing them with temporary fittings,
    configuring the isolated section into a closed loop by using connectors between (a) an end of the section and a manifold, (b) the manifold and a pump, and (c) the pump and a source of cleaning solution,
    wherein the connectors comprise a plurality of hoses which connect said temporary fittings to said manifold for circulation of cleaning solution through the isolated section in said closed loop,
    introducing an acid cleaning solution having a pH of about 2 to about 2.2 into the section,
    monitoring and maintaining said pH during cleaning of said section to effectively produce the cleaned section without damage to the aluminum piping,
    circulating the cleaning solution through the section in said closed loop to remove said marine scale and sediment from the interior of the section,
    removing the cleaning solution containing the marine scale and sediment from the section to provide a cleaned interior section, and
    restoring the cleaned section with the system.

2. The method of claim 1 wherein the system remains at least in part operational during the cleaning.

3. The method of claim 1 wherein a mobile unit initially contains the cleaning solution to be introduced into the system.

4. The method of claim 3 wherein a hose connected from the mobile unit introduces a cleaning solution into the isolated pipe section.

5. The method of claim 1 wherein the cleaning solution contains an organic acid.

6. The method of claim 5 wherein the organic acid is selected from the group consisting of formic, acetic, propionic, citric, glycolic, lactic, tartaric, polyacrylic, succinic, and sulfonic.

7. The method of claim 6 wherein the cleaning solution additionally contains an acid inhibitor and a dispersing agent.

8. The method of claim 1 wherein said spent cleaning solution is rendered environmentally safe before removal from said system.

9. The method of claim 8 wherein the cleaning solution is rendered environmentally safe by adding a treating agent to the spent cleaning solution prior to removal.

10. The method of claim 1 wherein the temporary fitting is a valve, plug, pipe, or combinations thereof.

11. The method of claim 1 wherein the isolated section is selectively operatively connected to a fire main system of the ship for restoration of the cleaned section with the countermeasure washdown system and the fire main system after cleaning.

12. The method of claim 1 comprising a plurality of manifolds in said closed loop and said plurality of hoses connect a plurality of temporary fittings to said plurality of manifolds for circulation of cleaning solution through the isolated section in said closed loop.

* * * * *